No. 862,345. PATENTED AUG. 6, 1907.
C. OLSEN.
STUMP PULLER.
APPLICATION FILED MAR. 25, 1907.
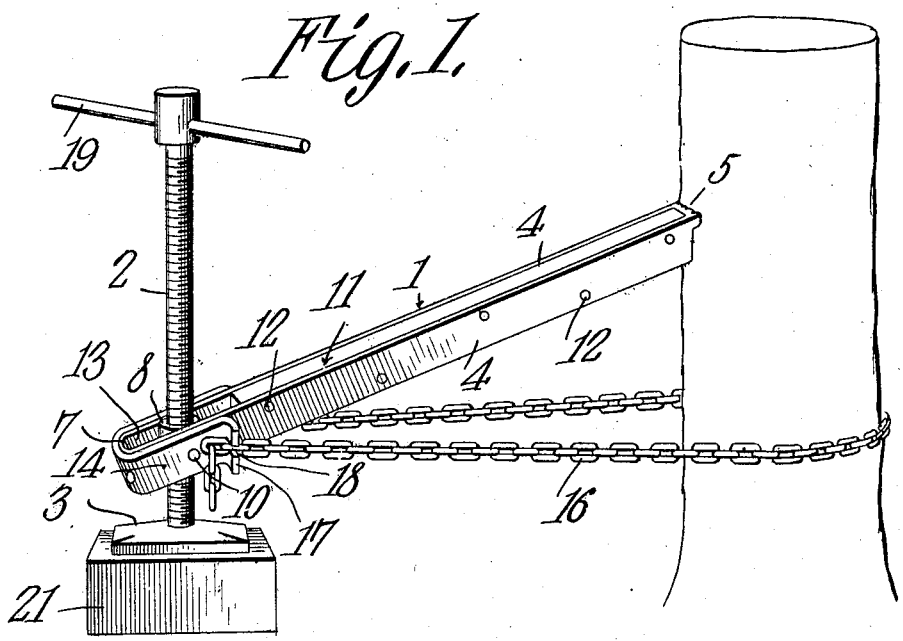
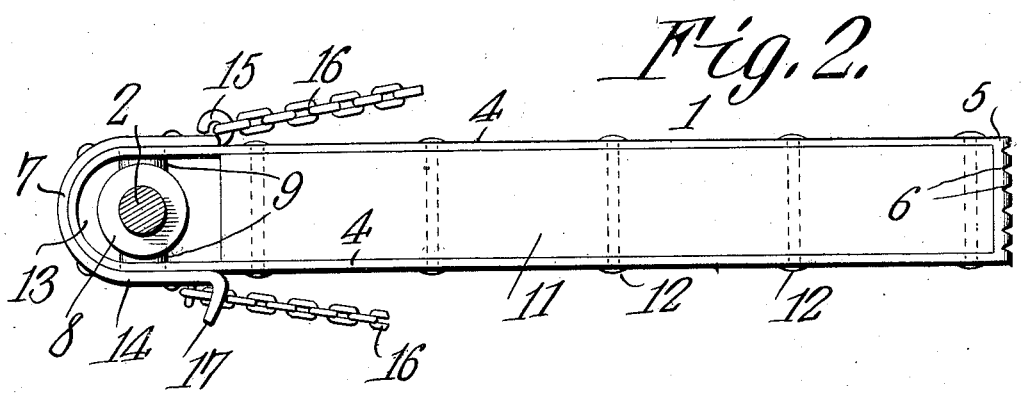
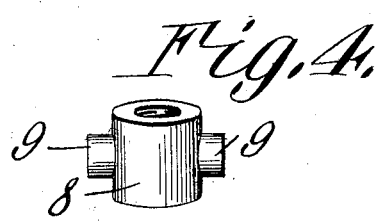
WITNESSES:
Carl Olsen, INVENTOR.
By C. A. Snow & Co.
ATTORNEYS

UNITED STATES PATENT OFFICE.

CARL OLSEN, OF ESCANABA, MICHIGAN.

STUMP-PULLER.

No. 862,345.  Specification of Letters Patent.  Patented Aug. 6, 1907.

Application filed March 25, 1907. Serial No. 364,323.

*To all whom it may concern:*

Be it known that I, CARL OLSEN, a citizen of the United States, residing at Escanaba, in the county of Delta and State of Michigan, have invented a new and useful Stump-Puller, of which the following is a specification.

This invention relates to an apparatus for removing stumps from the ground by exerting a side pressure thereon and overturning the stumps.

The object of the invention is to provide a simple, cheap and thoroughly practicable apparatus which may be easily operated by one person for removing old tree stumps from the ground by overturning them.

The apparatus is designed more particularly for use on tree stumps which have been standing a number of years and all or a greater part of the roots have become dead, and the hold the stump has in the ground is slight compared to that of a living tree or a stump from which a tree has recently been cut.

With this end in view the invention consists of certain novel combination and arrangement of parts hereinafter described, illustrated in the drawings and pointed out in the claims.

In the accompanying drawings: Figure 1 is a perspective view of the improved stump puller applied to a tree stump. Fig. 2 is a plan view on an enlarged scale of the push bar and certain detail parts connected thereto. Figs. 3 and 4 are views of certain details of construction.

Similar numerals of reference indicate corresponding parts throughout the several figures of the drawings.

In carrying out this invention a push bar 1 is employed, one end of which bears against the stump to be removed while through its other end passes a threaded standard 2 supported on a base plate 3. The push bar 1 is preferably made with two side plates 4 of metal, either cast or rolled, united at one end by a straight end piece having a projecting lip 5 which may be notched as shown in Fig. 2 to form teeth 6 to prevent the bar from slipping when placed against the stump. At the opposite end 7 of the bar 1, which is of semi-circular form, a nut 8 having projecting lugs 9 is pivoted between the plates 4 of the bar, the pivot pins 10 entering the lugs 9. Between the side plates 4 is placed a filling piece 11 of wood fastened securely to the side plates 4 by rivets or bolts 12, which pass transversely through the plates and the filling piece. The filling piece 11 extends from the lip 5 nearly to the end 7, a space 13 being left to permit the nut 8 to rock on its pivots 10.

Surrounding the end 7 of the bar 1 is a U-shaped plate 14 of metal riveted to the side plates 4 and extending up the bar 1 about as far as the end of the filling piece 11. One end of the U-shaped plate 14 is provided with an eye 15 to which the chain 16 is permanently attached, the opposite end of the plate 14 which is on the other side of the bar 1 terminates in a hook 17 provided with a central notch 18 of such width that the links of the chain 16 may be placed therein flatwise and be held by the next link behind extending crosswise thereof.

Threaded in the nut 8 is the vertically disposed screw standard 2 of a length sufficient for the desired purpose and having a cross bar 19 at its upper end for rotating the standard and causing the nut 8 to rise and fall thereon. The lower end of the standard 2 is seated in a metal block 3 of the shape shown in Figs. 1 and 3, a seat 20 in the block or base plate 3 receives the lower end of the standard 2. The base plate 3 is supported by a block 21, which may be increased in number or entirely removed when operating to overturn the tree stump.

To use the apparatus, a block or other suitable support 21 is placed on the ground near the stump to be removed and the base plate 3 supported thereon. The threaded standard 2 is then placed on the base plate on the seat 20, the nut 8 having been run down on the standard to its lower end. The chain 16 is then passed around the stump and connected to the hook 17, the push bar 1 having been first placed against the side of the stump at a suitable angle extending upwardly from the nut 8. The pivotal connection between the nut and the push bar permits the latter to be moved easily in a vertical direction. The apparatus being now in position with its threaded standard 2 vertically disposed, the chain 16 approximately horizontal and the push bar 1 inclined upwardly with its lip 5 resting against the stump above the same, the cross bar 19 is grasped by the hand of an operator and the standard rotated, causing the nut 8 to rise thereon until it reaches the top of the threaded portion, or until the push bar is in horizontal position. One end of the push bar 1 resting firmly against the tree would naturally cause the other end carrying the nut to move away from the tree as it approaches the horizontal position, but the chain 16 surrounding the tree stump below the push bar and attached to the push bar near the nut 8 prevents that end from moving away from the stump, with the natural consequence that the opposite end resting against the stump will be compelled to move in a horizontal direction and carry the upper end of the stump with it. After the bar has reached the limit of its pushing power, and the stump still remains firmly in the ground the nut 8 is returned to the bottom of the standard 2 and a second block placed upon the block 21, thus elevating the plate 3 which will enable the apparatus to be reset in a new position on the stump and the operation heretofore described repeated and continued until the stump has been thoroughly loosened from the ground.

Having thus described the invention what is claimed is:—

A stump extractor comprising a stiff member adapted to bear at one end against the side of a stump and having a vertically slotted opening in its other end, a nut mounted on horizontal pivots in said opening, a yoke-shaped plate embracing the slotted end of the stiff member and provided with an eye on one side and a hook on the other, a flexible member attached to said eye and adapted to pass around the stump and connect to said hook, and a threaded standard in said nut for raising the joined ends of the two members.

In testimony that I claim the foregoing as my own, I have hereto affixed my signature in the presence of two witnesses.

CARL OLSEN.

Witnesses:
   GOTHURD ARNSEN,
   ARN ARNSEN.